United States Patent

[11] 3,579,053

| | | | | |
|---|---|---|---|---|
| [72] | Inventor | Arthur K. Littwin<br>6555 N. Le Mai, Lincolnwood, Ill. | | |
| [21] | Appl. No. | 740,052 | | |
| [22] | Filed | June 26, 1968 | | |
| [45] | Patented | May 18, 1971 | | |

[54] MAGNETIZING AND DEMAGNETIZING APPARATUS AND METHOD
14 Claims, 3 Drawing Figs.

[52] U.S. Cl. ..................................................... 317/157.5
[51] Int. Cl. ..................................................... H01f 13/00
[50] Field of Search .......................................... 307/104; 317/157.5; 335/290

[56] References Cited
UNITED STATES PATENTS

| 2,632,035 | 3/1953 | Jaeger | 317/157.5 |
|---|---|---|---|
| 2,946,932 | 7/1960 | Littwin | 317/157.5 |
| 3,045,151 | 7/1962 | Littwin | 317/157.5 |
| 3,078,396 | 2/1963 | Engelsted | 317/157.5 |
| 3,237,056 | 2/1966 | DuPuy | 317/157.5X |
| 3,300,688 | 1/1967 | Callihan | 317/157.5X |
| 3,368,119 | 2/1968 | Littwin | 317/157.5 |

*Primary Examiner*—William M. Shoop, Jr.
*Attorney*—Paul H. Gallagher

ABSTRACT: Apparatus for magnetizing and demagnetizing, including means for adjustable controlling the current and voltage applied to the object to be magnetized, for thereby controlling the speed of magnetic saturation to more accurately sense the level of saturation in the demagnetizing steps.

INVENTOR
Arthur K. Littwin
BY Paul H. Gallagher
Atty.

Patented May 18, 1971

INVENTOR
Arthur K. Littwin
BY Paul H. Gallagher
Atty.

Patented May 18, 1971

INVENTOR
Arthur K. Littwin
BY Paul K. Gallagher
Atty.

MAGNETIZING AND DEMAGNETIZING APPARATUS AND METHOD

BACKGROUND

The field of the invention is in demagnetizing and its principal application is in connection with machine tools. In a grinder for example, a workpiece is held in place by a magnetic chuck while the grinding operation is performed on the workpiece, and thereafter it is necessary to demagnetize the chuck in order to remove the workpiece.

For so holding the workpiece in place, the chuck is magnetized to its normal full capacity, or level of magnetism, and then to demagnetize the chuck, its magnetism is reversed in polarity and in so reversing it, is reduced to zero and then increased but to a degree less than in the previous step, and after a succession of such steps the magnetism is left at a level near zero. This general kind of demagnetizing is in itself known, as represented for example in my prior U.S. Pat. No. Re. 25,607, dated June 30, 1964.

Chucks have gone through an evolution of refinement, and many modern chucks are faster saturating than previously. The invention involves sensing the level of magnetism of the chuck for initiating successive steps in the demagnetizing operation, and the fast saturation of the chuck renders more critical the point at which sensing for the reversal for each succeeding step is made; that is, a reversal should be made at a point wherein a current flow in the chuck is as near zero as practical, to prevent arcing and other objectionable phenomenons.

The invention encompasses broadly magnetizing, as well as demagnetizing, since in the demagnetizing operation, actual magnetizing steps are performed, as will be brought out in the detail specification herein.

OBJECTS OF THE INVENTION

A broad object of the invention is to provide apparatus and method of the foregoing general character wherein the points at which the reversing steps are performed, are more accurately controlled.

Another object is to provide apparatus and method of the foregoing character wherein the determination of the reversing steps is controlled by a condition of voltage and current values, and more particularly in predetermining those conditions of voltage and current values.

Another broad object of the invention is to provide apparatus and method of the foregoing character which can be adjusted and controlled for accelerating the control effects to be sensed with respect to slow saturating chucks, and decelerating the control effects to be sensed with respect to fast saturating chucks.

A more specific object is to provide apparatus and method of the kind just stated, wherein the apparatus can be readily predesigned for accommodating a magnetic chuck of any of a wide variety of operating characteristics.

Still another object is to provide apparatus and method of the foregoing character wherein the reversing steps include a timing operation.

More specifically an object is to provide a timing operation as just referred to, by utilizing timing relays.

DESCRIPTION OF A PREFERRED EMBODIMENT

Figure 1:
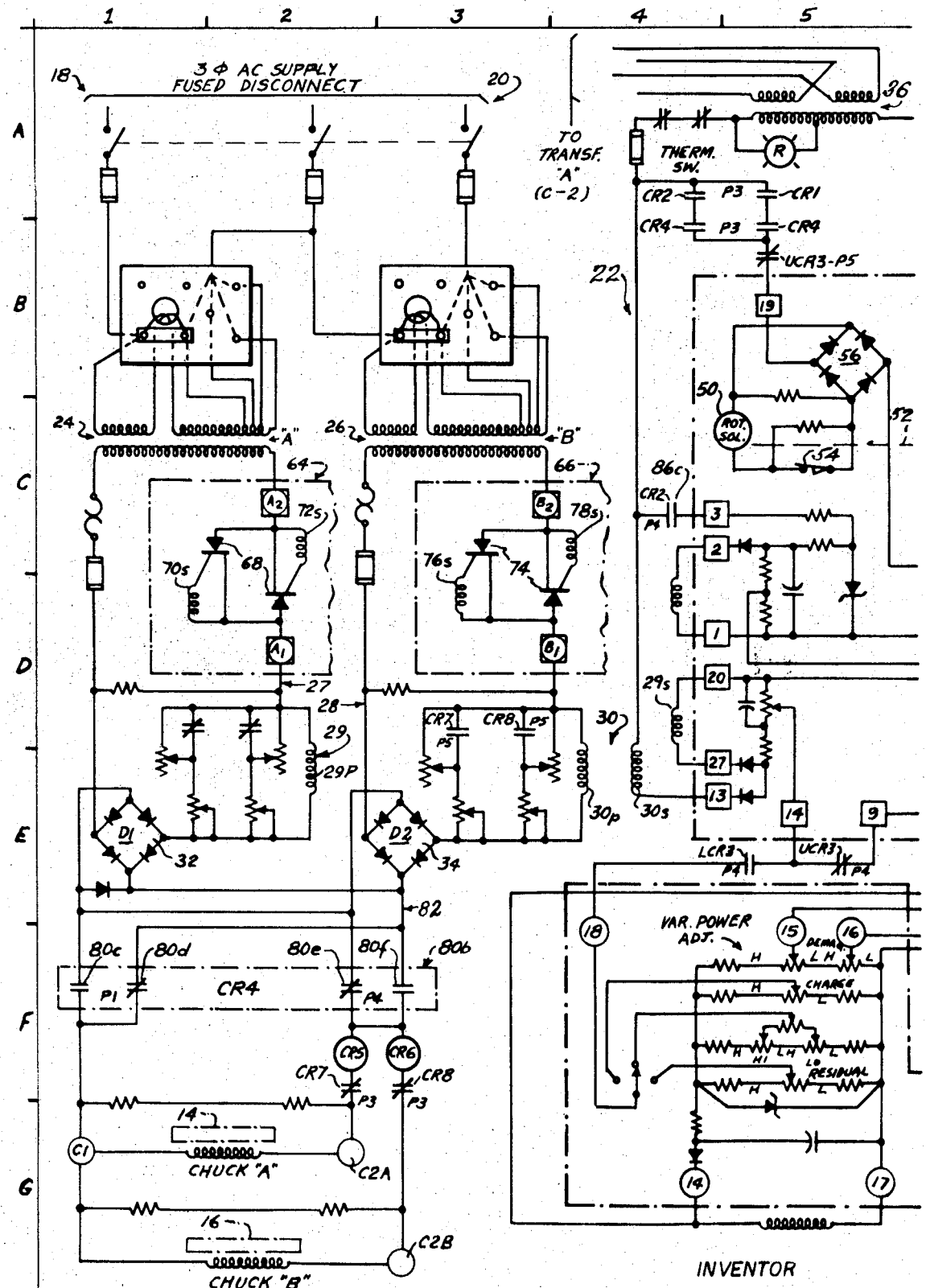
Figure 2:
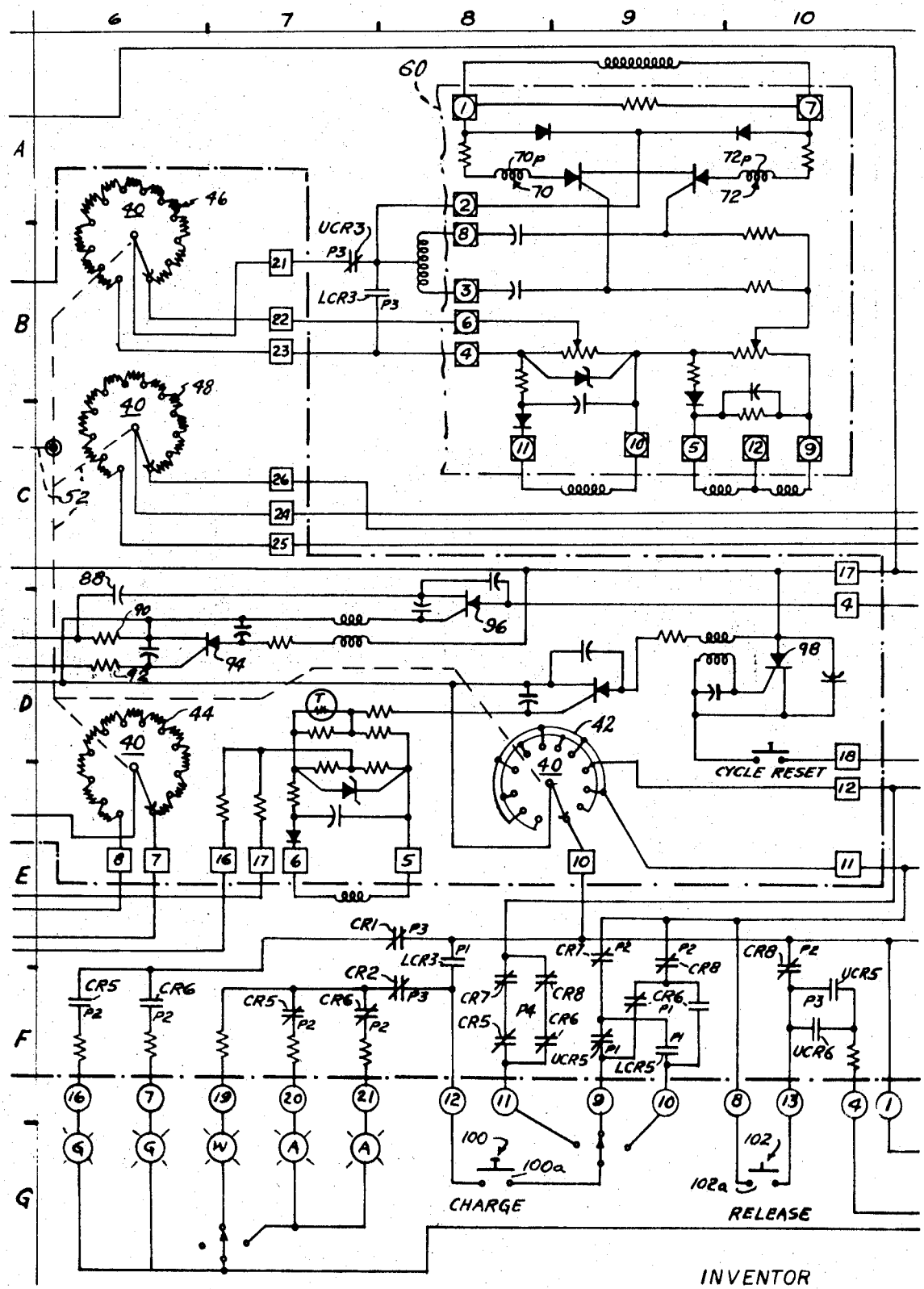
Figure 3:
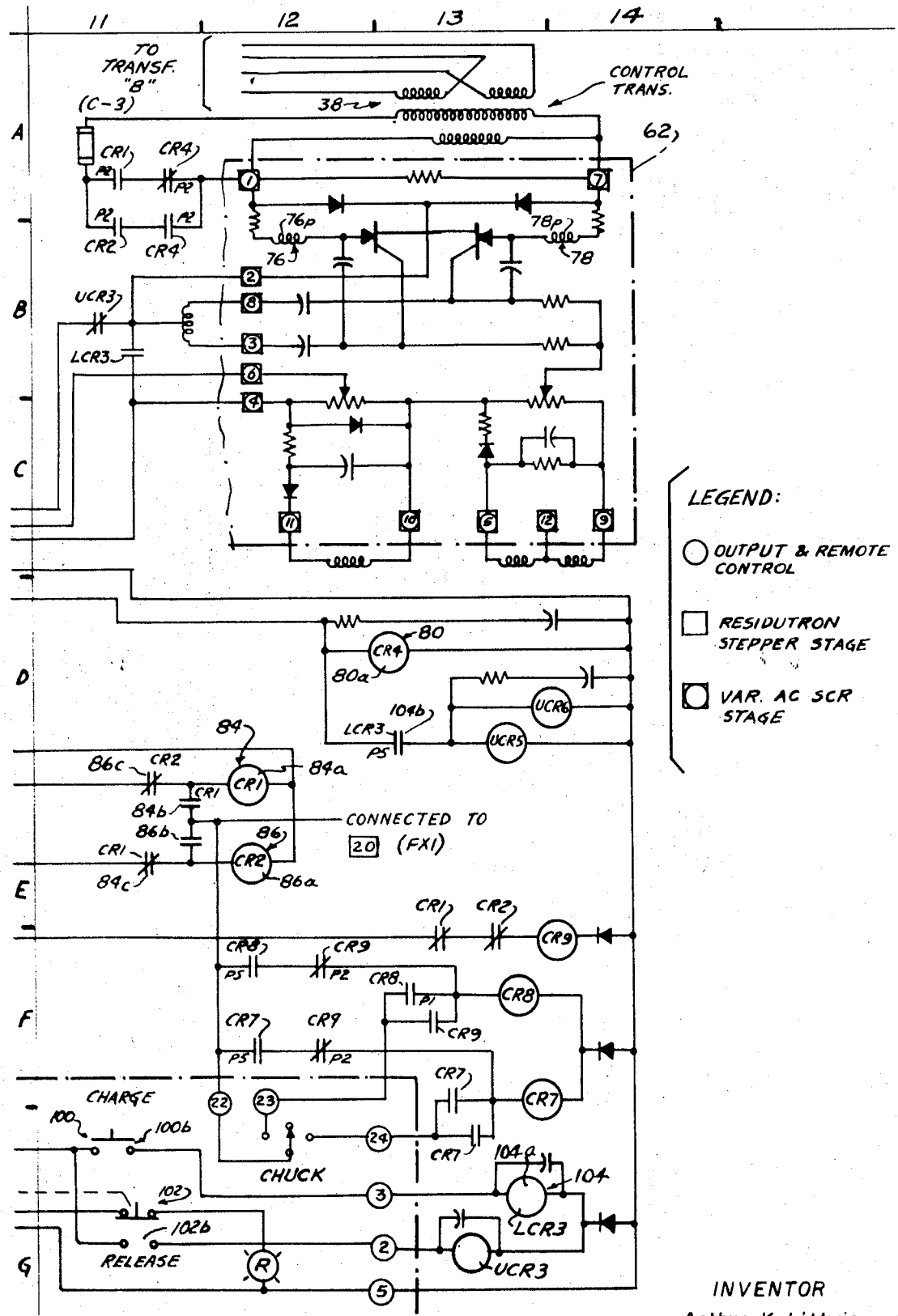

In the drawings:

FIGS. 1, 2, and 3 are to be relatively positioned from left to right in this order, and when so positioned, show the electrical circuit utilized in the apparatus of the invention.

For the convenience in locating the various elements in the circuit the drawings are provided with letter-number coordinates as a single series continuing through the several sheets of the drawings, and these coordinates are contained in parenthesis in the specification following various ones of the reference numerals.

Referring in detail to the circuit of the drawings, chucks are shown at 10 and 12(G-2) with which are associated workpieces 14 and 16 respectively. Although two chucks are shown, the apparatus may include a single chuck, or more than two, as desired. Each chuck is incorporated in a machine tool as on a reciprocating table, as for example in a grinder, and is utilized for holding the workpiece on the table in a known manner. The chucks may be of permanent magnet or electromagnet type, as desired, within the compass of the invention.

An electrical source is indicated generally at 18(A-1) which in the present instance is a three phase AC supply. The circuit includes a power section or portion 20(A-3) and a control section or portion 22(B-4). In the power section are power transformers 24(C-1), 26(C-3) associated with two phases of the AC, which are connected in subcircuits 27(D-1), 28(D-2) which include rectifiers 32(E-1), 34(E-3) for providing DC to the chucks. In the subcircuits 27, 28 are transformers 29(D-2), 30(D-4) respectively having primaries 29p, 30p in those subcircuits associated with secondaries 29s(D-b-), 30s(D-4) in the control circuit.

Incorporated in the control section 22 are control transformers 36(A-5), 38(A-12) connected in the source 18 as indicated, and controlling two phases of the AC in association with the power transformers 24(C-1), 26(C-3).

Incorporated in the control section 22 is a stepping means indicated generally at 40(A-6) including four sections or wafers mounted in gang for conjoint stepping, namely, cycle relay means 42(E-9) a DC pulse bias switching section 44(E-6), an AC bias switching section 46(C-6) and another AC bias switching section 48(C-6). The stepping means is driven by a rotor solenoid or motor means 50(C-4) through drive means indicated generally at 52(C-6) under the control of an interrupter switch 54(C-5) the rotor solenoid 50 deriving DC power from a rectifier 56(B-5). The AC bias switching section 46(A-6) is associated with a control unit 60(A-8) while the section 48(C-6) is associated with a control unit 62(A-4), these two units being respectively associated with control transformers 36(A-5), 38(A-12).

Each of the stepping means sections 44, 46, 48 is provided with a plurality os series resistors, in this case eleven, and an arm which in sweeping thereover places the resistors in circuit. The arm in each case is shown at a home position in which none of the resistors are in circuit, and in the cycling operation the arm moves as indicated, clockwise, and in the first step in its advancing movement, all of the resistors are put in circuit, and one less in each succeeding step.

In the subcircuits 27, 28 of the power section are units 64(C-2), 66(C-4), the former including back-to-back diodes 68(C-2), respectively controlled by transformer secondaries 70s, 72s, of corresponding transformers 70, 72, having primaries 70p(A-8), 72p(A-10); similarly, in the unit 66 are back-to-back diodes 74(C-3) controlled by transformer secondaries 76s 78s, of transformers 76, 78 having primaries 76p(B-1 2), 78p(B-14).

For the purpose of reversing the current applied to the chucks, a relay 80(D-13) is provided, having a coil 80a(D-1 3) and contacts 80b(F-3) in a DC circuit 82(F-3) leading from the rectifiers 32(E-1), 34(E-3) to the chucks. The relay 80 is of a type known generally in that it is stable in each of opposite positions, in one position maintaining the contacts 80b in the position shown, and in the opposite position maintaining the contacts in the opposite position. The relay 80 is controlled by a pair of control relays 84(E-12), 86(E-12).

In references to relays in the circuit, the relay as a whole is given a general reference numeral, the coil the same reference numeral with the subscript a, and the respective contacts the same reference numeral with subscripts b, c, and d, etc. Other contacts of certain ones of the same relays, and other relays, are shown in the drawing but not specifically referred to, and the relation therebetween is similarly indicated by other identifying references; while these contacts and relays are not described their operation will be understood by a person skilled in the art.

Other controls incorporated in the control circuit include a capacitor 88(D-6), a resistor 90(D-6), another resistor 92(D-6), and gate means 94(D-7), 96(D-8), 98(D-10).

The circuit also includes a button 100(G-8) for turning on the circuit and indicated as "Charge" and including, for convenience, two portions 100a and 100b(G-11); the circuit also includes a "Release" button 102(G-10) shown in two parts 102a and 102b(G-11), this button releasing the circuit from the "Charge" condition and initiating the demagnetizing cycle.

The apparatus is operative for completely controlling the magnetizing and demagnetizing of the chuck. When the workpiece is placed on the chuck, the chuck is to be magnetized of course and in the overall control of the chuck, the present apparatus is operative for both magnetizing and demagnetizing it. In the complete control of the chuck as thus indicated, to first fully magnetize or "Charge" the chuck, the charge button 100(G-8) is depressed, which energizes relay 104(G-14) and through contacts 104b(D-13) deenergizes the relay 80(D-13). The circuit then is effective for charging the chucks in accordance with the settings of the contacts 80b(E-3) in their then condition which is that indicated in the circuit diagram. The chucks then are magnetized to their maximum level of magnetism and the circuit remains stably in that condition until another operating step is performed, namely the demagnetizing cycle, and this is initiated by depression of the "Release" button 102(G-10). Upon depression of that button the demagnetizing cycle is initiated, and it progresses through twelve steps in accordance with such number of steps arbitrarily selected in the present instance.

In accordance with the principles of the invention, the relays 84(d-12), 86(E-12), which both control the relay 80(D-13), are constructed with a built-in delay under control of the capacitor 88(D-6), resistors 90(D-6), 92(D-6), and gate means 94(D-7), 96(D-8), 98(D-10). Upon depression of the Release button 102(G-10), the relay 86(E-12) is energized, and this relay upon termination of a certain time interval controls he relay 80(D-13); this time interval is controlled by the operating characteristics of the capacitor 88, resistors 90, 92 and gate means 94, 96, 98, and upon expiration of that time interval, it is activated and energizes the relay 80(D-13); energization of both of these relays 86(E-12), 80 completes the circuit through the rotor solenoid 50(C-4) and the latter advances the stepping means one step, until the arms of the sections 44(E-6), 46(A-6), 48(C-6) are moved forwardly in one direction, i.e., clockwise as viewed. This actuation of the relay 80(D-13) reverses the contacts 80b(E-3) and the DC is directed through the chucks in the direction opposite that of the original charge. This reverse direction DC through the chucks reduces the magnetism to zero and then builds the magnetism in the opposite polarity, but to a level less than that established in full "charge." The establishment of this lesser level is controlled through a sensing means which includes the transformers 29(D-2), 30(D-4) and the section 44(E-6) of the stepping means; the reduction of magnetism and the buildup in the opposite polarity creates an inductance or counter emf, and upon the current produced by the inductance reaching a certain level, it is sensed by means of the transformers 29(D-2), 30(D-4) and by means of the section 44 of the stepping means which is also in its 01 advanced position, a current is set up, and this current, under the control of the resistor 92(D-6) and gate means 94(D-7), 96(D-8) energizes and actuates the relay 84(D-12). This relay deactivates the relay 86(E-12) and reverses the position of the relay 80(D-13), in turn reversing the contacts 80b(F-3). The polarity of the DC passing through the chucks is accordingly reversed.

This same operation energizes the rotor solenoid 50(C-4) which steps the stepping means 40(A-6) another step and the cycle is completed, but in each succeeding step, the current imposed on the chucks, which in turn is controlled by the units 64(C-2), 66(C-4), is reduced, and the latter are under the control of the transformer secondaries 70s, 72s, 76s, 78s so as to direct less current to the chucks in each succeeding step. The overall effect is that less current is imposed on the chucks in each succeeding step so that it is demagnetized to zero and magnetized in the other direction in a succeeding step, but at a lower level, and at a lesser rate; in the same manner, the buildup of voltage and current in the chucks is at a lesser rate and this lesser rate is reflected through control transformers 29(D-2), 30(D-4), and the sensing of this voltage and current, through the section 44(E-6) of the stepping means is on a correspondingly reduced level so that the control and triggering of the control elements 90(D-6), 92(D-6), 94(D-7), 96(D-8), 98(D-10) is more slowly established with slower transmission of effect on the control relays 84(E-12), 86(E-12), and hence consequent energization of the relay 80(D-13) which is the instrumentality directly causing the reversal of the current through the chucks.

As stated above magnetic chucks, as in the case of permanent magnets, are manufactured of various characteristics, and in more recent times are faster acting, i.e., they become saturated more quickly. Because of delays inherent in various instrumentalities in an electrical circuit, a fast-acting phenomenon requires more critical responsiveness. If the circuit is opened at an instant when the current is too high, excessive arcing is set up, but in the use of the present apparatus, the reversal can be made at a point when the buildup of current is at absolute zero, entirely eliminating arcing.

The buildup of magnetism in opposite directions and in the successive steps is at a controlled rate, under the sections 46(A-6), 48(C-6) of the stepping means so that in each step, the demagnetizing and reverse magnetizing is at a slower rate, and the corresponding buildup in the chucks is at a slower rate, enabling more accurate control through the section 44(E-6) and the control relays 84(E-12), 86(E-12).

The control is established through selection of the components 88(D-6), 90(D-6), 92(D-6), 94(D-7), 96(D-8), 98(D-10), according to their operating characteristics so that the buildup of current in the chuck is at the desired rate for effective actuation and operation of the control relays 84, 86.

The characteristics of the control components just referred to, namely, 88, 90, 92, 94, 96, 98, may be selected for not only delaying the control responsiveness, or control effects to be sensed, of a fast saturating chuck, but it may be selected in an opposite sense so as to accelerate the control responsiveness, or control effects to be sensed, of those control components.

An advantage of the invention is that a plurality of chucks of different characteristics can be accommodated. For example, the relays 80(D-13), 84(E-12), 86(E-12) can be applied to respective chucks, or multiplied for plural chucks to control the chucks individually. The characteristics of those control elements may include differences in timing characteristics.

I claim:

1. Apparatus for demagnetizing a magnet which includes necessarily magnetizing it in the steps of demagnetizing it, comprising
   a. circuit means including the magnet and adapted for connection with an electrical source which includes means for applying voltage and current to the magnet for thereby magnetizing it,
   b. cycling means including a rotary assembly which itself includes a relay switch section, and a plurality of bias switching sections,
   c. means for adjustably varying the voltage applied to the magnet,
   d. means for adjustably varying the current applied to the magnet,
   e. stepping means for advancing the rotary assembly through a predetermined cycle, including
      1. means responsive to the voltage applied to the magnet for advancing the stepping means,
      2. means responsive to current in the magnet for advancing the stepping means,
   f. means for selectively sensing the voltage and the current applied to the magnet for advancing the stepping means, g. and means responsive to the sensing of the selected one of the voltage and current values and operative for reducing the value of that selected one in successive steps in the cycle to a value near zero, h. and means controlled by the stepping means for reversing the polarity of the voltage applied in successive steps, whereby upon the selected one reaching a value sufficiently low as to be ineffective for producing a successive step in the cycling means and the cycle is thereby terminated.

2. A method according to claim 1 and in conjunction with a plurality of magnets of different magnetic characteristics, and including the step of sensing the level of magnetism of the magnets and establishing time intervals between the steps according to the levels of magnetism in the respective magnets.

3. Apparatus according to claim 1 and including means for sensing the current flow in the magnet at each step operative upon termination of that current flow for initiating the succeeding step.

4. Apparatus according to claim 1 and including means responsive to a voltage condition as applied to the magnet for terminating each step and initiating a succeeding step.

5. Apparatus according to claim 1 and including relays for reversing the polarity of the magnetism of the chuck, and means responsive to the level of magnetism of the chuck operative for predetermining the operation of the relays at successive ones of such steps.

6. Apparatus according to claim 5 and including (relay means for reversing the polarity of the magnet at each step, said relay means including reversing switches and relay coil controlling the switches, and) a pair of secondary relays independently timing the actuation of the reversing relay in opposite directions corresponding to successive ones of said steps.

7. Apparatus according to claim 6 wherein said secondary relays are responsive to the level of magnetism in the magnet at the corresponding and alternate steps in the cycle of operation.

8. A plurality of apparatuses according to claim 1 wherein the magnets are of different characteristics, and the relay means for reversing the polarity in the magnets in the several apparatuses are operative for predetermining steps of different characteristics according to the corresponding characteristics of the magnet.

9. A plurality of apparatuses according to claim 8 wherein the successive steps are of respectively different time intervals in the different apparatuses.

10. Apparatus according to claim 1 and including means responsive to termination of inductance in the magnet at each step operative for controlling the relays for initiating successive steps.

11. Apparatus according to claim 1 and including stepping means operable through a cycle of a predetermined number of steps, means for advancing the stepping means through said cycle, and control means responsive to termination of inductance in the magnet at each step for advancing the stepping means through each succeeding step.

12. A method of demagnetizing a magnet, comprising establishing a cycle of operation having a predetermined number of steps, applying a predetermined voltage to the magnet, and thereby applying a corresponding predetermined current thereto, advancing the cycle of operation, selectively sensing the voltage and current for reversing the polarity of the voltage, continuing the cycle and sensing the selective voltage or current at each step of the cycle and reducing the value thereof at each reversal thereof and so reducing it at each step to a value near zero at the final step.

13. A method according to claim 12 wherein successive steps are of predetermined different time intervals.

14. A method according to claim 13 wherein the successive steps are of successively lesser time intervals.